(12) United States Patent
Reith et al.

(10) Patent No.: US 11,760,242 B2
(45) Date of Patent: Sep. 19, 2023

(54) VEHICLE SEAT BACKREST

(71) Applicant: FAURECIA Sièges d'Automobile, Nanterre (FR)

(72) Inventors: Carsten Reith, Niedernwöhren (DE); Jean-Marie Mauffrey, Champagney (FR); Didier Duriez, Le Plessis-Pâté (FR); Yesh Prajapati, Pune (IN); Jean-Yves Piederriere, Angerville (FR); Etienne Poulet, Saint Bresson (FR); Benoît Gazaniol, Arpajon (FR)

(73) Assignee: FAURECIA Sièges d'Automobile, Nanterre (FR)

( * ) Notice: Subject to any disclaimer, the term of this patent is extended or adjusted under 35 U.S.C. 154(b) by 0 days.

(21) Appl. No.: 17/545,319

(22) Filed: Dec. 8, 2021

(65) Prior Publication Data
US 2022/0176857 A1   Jun. 9, 2022

(30) Foreign Application Priority Data

Dec. 9, 2020 (FR) ..................................... 20 12942
Jun. 29, 2021 (FR) ..................................... 21 06982

(51) Int. Cl.
*B60N 2/70* (2006.01)
*B60N 2/58* (2006.01)
(Continued)

(52) U.S. Cl.
CPC ......... *B60N 2/7029* (2013.01); *B60N 2/5816* (2013.01); *B60N 2/72* (2013.01); *B60N 2/894* (2018.02)

(58) Field of Classification Search
CPC ... B60N 2/70; B60N 2/79; B60N 2/58; B60N 2/5816; B60N 2/5833; B60N 2/874; B60N 2002/905
See application file for complete search history.

(56) References Cited

U.S. PATENT DOCUMENTS 4,607,887 A   8/1986   Vail
5,441,331 A   8/1995   Vento
(Continued)

FOREIGN PATENT DOCUMENTS

CN   110626241   12/2019
CN   213383970   6/2021
(Continued)

OTHER PUBLICATIONS

Office Action (Non-Final Rejection) dated Jan. 10, 2023 for U.S. Appl. No. 17/545,329, B2020600FRUS US-U II (pp. 1-9).
(Continued)

*Primary Examiner* — Timothy J Brindley
(74) *Attorney, Agent, or Firm* — BARNES & THORNBURG LLP

(57) ABSTRACT

A backrest of a vehicle seat includes an armature and an upholstery fixed to the armature. The upholstery has a slit for accommodating a headrest support rod by relative movement of the upholstery with respect to the armature in a longitudinal direction of the vehicle seat. The backrest further includes first and second trim elements. Each trim element forms a notch. The notches of the first and second trim elements define a passage for a headrest support rod. The second trim element partially covers the slit in the upholstery. The first and/or the second trim elements is/are in contact with the upholstery.

19 Claims, 12 Drawing Sheets

Figure 1:
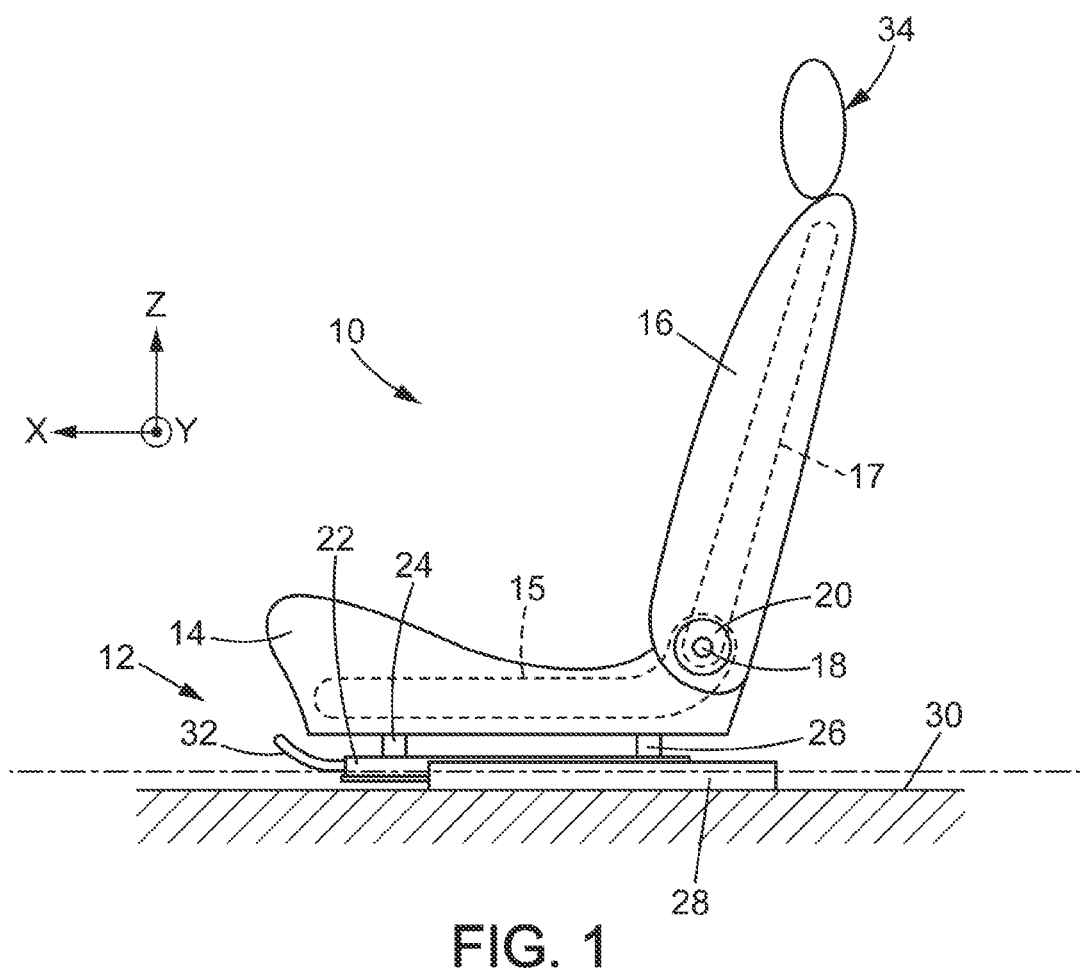

(51) Int. Cl.
   *B60N 2/894* (2018.01)
   *B60N 2/72* (2006.01)

(56) References Cited

U.S. PATENT DOCUMENTS

| | | | |
|---|---|---|---|
| 5,601,332 | A | 2/1997 | Schultz |
| 10,131,317 | B1 | 11/2018 | Harrington |
| 10,272,800 | B2 | 4/2019 | Whitmore |
| 10,882,432 | B1 | 1/2021 | Bosen |
| 2016/0129818 | A1* | 5/2016 | Sahashi ............... B60N 2/5825 297/452.61 |
| 2017/0368960 | A1 | 12/2017 | Whitmore |
| 2018/0022258 | A1* | 1/2018 | Matsushima ............ B60N 2/80 297/440.1 |
| 2018/0070731 | A1 | 3/2018 | Jibiki |
| 2019/0001854 | A1* | 1/2019 | Gunn ...................... B60R 7/10 |
| 2019/0176664 | A1* | 6/2019 | Walser ................ B60N 2/5891 |
| 2020/0070699 | A1 | 3/2020 | Kakishima |
| 2020/0139867 | A1 | 5/2020 | Ceglarek |
| 2021/0039583 | A1 | 2/2021 | Gumprecht |
| 2022/0194275 | A1* | 6/2022 | Schulz .................. B60N 2/874 |

FOREIGN PATENT DOCUMENTS

| | | | | |
|---|---|---|---|---|
| DE | 102010005801 | | 6/2011 | |
| DE | 102011087172 | A1 * | 5/2012 | ........... B60N 2/5833 |
| DE | 102018208693 | A1 * | 12/2019 | ............... B60N 2/64 |
| EP | 4029730 | A1 * | 7/2022 | ............... B60N 2/22 |
| JP | 2008279109 | A * | 11/2008 | ........... B60N 2/4855 |
| KR | 20120000864 | U * | 2/2012 | |
| KR | 200481496 | Y1 * | 10/2016 | |

OTHER PUBLICATIONS

Office Action (Non-Final Rejection) dated Jul. 18, 2023 for U.S. Appl. No. 17545329, B2020600FRFRUS US-U II (pp. 1-9).

* cited by examiner

VEHICLE SEAT BACKREST

PRIORITY CLAIM

This application claims priority to French Patent Application No. FR2012942, filed Dec. 9, 2020, and French Patent Application No. FR2106982, filed Jun. 29, 2021, each of which is expressly incorporated by reference herein.

BACKGROUND

The present disclosure relates to a vehicle seat backrest, in particular of a motor vehicle. A vehicle seat comprising such a backrest, a method for mounting a vehicle seat backrest and a vehicle seat comprising such a backrest are also described. Further, the present disclosure also relates to a method for replacing at least a part of the upholstery of a vehicle seat backrest.

SUMMARY

According to the present disclosure, a vehicle seat backrest is includes a backrest armature, a backrest upholstery fixed to the backrest armature, the backrest upholstery having at least one slit, each slit being adapted to receive a headrest support rod by relative movement of the upholstery with respect to the backrest armature in a longitudinal direction of the vehicle seat, and at least a first and a second trim element, each trim element forming at least one notch, a notch of the first trim element and a notch of the second trim element defining a passage for a headrest support rod, the second trim element covering at least partially, preferably completely, the at least one slit in the upholstery, at least one of the first and second trim elements being in contact with the upholstery, in particular with a foam block of the upholstery.

In illustrative embodiments, the upholstery of such a backrest can easily and quickly be mounted onto the backrest armature and/or removed from the backrest. In particular, the upholstery can be mounted from a front face of the backrest, optionally while the headrest support rod/s is/are already mounted on the backrest armature. Likewise, it is possible to remove the upholstery towards the front of the backrest, without having to remove the headrest support rod/s, or preferably the headrest itself. However, the presence of the first and second trim elements provide an aesthetic finish of the seat backrest, which is particularly appreciated by users.

In illustrative embodiments, the vehicle seat backrest includes one or several of the following features, taken alone or in combination:

each trim element forms two notches, such that each notch of the first trim element is facing a respective notch of the second trim element so as to define a passage having a complementary cross section to the cross section of a respective headrest support rod;

the first trim element is fixed to at least one of the upholstery, in particular a foam block of the upholstery, or a support of a foam block of the upholstery, and the backrest armature, in particular by elastic interlocking, and/or the second trim element is fixed to at least one of the upholstery, in particular a foam block of the upholstery or a support of a foam block of the upholstery, the backrest armature and the first trim element, in particular by elastic interlocking;

the second trim element is fixed only to the first trim element;

the upholstery, in particular a foam block of the upholstery, has a groove accommodating a complementary relief of the first trim element, in particular a rib of the first trim element;

the upholstery, in particular a foam block of the upholstery, has a recess having a section complementary to a part of the first trim element, the recess being preferably arranged on an opposite side of the headrest support rods with respect to the groove if applicable;

the first trim element and/or the second trim element compresses the upholstery, in particular a foam block of the upholstery;

the first trim element comprises means for fixing it to the upholstery, in particular to a support of a foam block of the upholstery, in particular elastic interlocking reliefs;

the second trim member is shaped as a curved shell, the curvature of the shell being substantially equal to the curvature of a portion of the upholstery, in particular of a foam block of the upholstery, covered by the second trim element;

the second trim element comprises means for fixing it to the first trim element, in particular at least one elastic interlocking relief;

the first and second trim elements include complementary guiding means for guiding a relative movement of the second trim element with respect to the first trim element to a fixation position of the second trim element, the complementary guiding means preferably comprising at least one, more preferably at least two and even more preferably four pair/s of a projecting relief on one among the first trim element and the second trim element and of a female relief adapted to accommodate the projecting relief, on the other among the first trim element and the second trim element;

the upholstery comprises at least one central upholstery module, adapted to be fixed to the backrest armature;

the vehicle seat backrest further comprises two side upholstery modules each arranged on a respective side of the central upholstery module, each of the three upholstery modules being preferably adapted to be fixed to the backrest armature independently of the other two upholstery modules, each of the three upholstery modules being more preferably fixed to the backrest armature independently of the other two upholstery modules;

each upholstery module includes a upholstery independent with respect to the upholstery of the two other upholstery modules;

the central upholstery module includes at least one support, fixed to the backrest armature, and a foam block covering all or part of the support, the first and/or the second trim element(s) preferably being fixed to the support of the central upholstery module, if applicable;

each side upholstery module includes a support to which a foam block is fixed;

the central upholstery module and/or at least one, preferably each of the side upholstery modules comprise/s a respective cover, each cover covering at least part of the respective foam block, if applicable;

the vehicle seat backrest further comprises a common cover covering all or part of the three upholstery modules, in particular the foam blocks of the three upholstery modules, if applicable.

In illustrative embodiments, a motor vehicle seat is also described, comprising a seating base with a seating base armature and a backrest as described above in all its combinations, the backrest armature being fixed to the seating base armature, preferably so as to be pivotable about a transverse axis.

In illustrative embodiments, there is described a method of mounting a motor vehicle seat backrest as described above in all its combinations, comprising the steps consisting in:

providing a backrest armature;

providing upholstery adapted to be fixed onto the backrest armature over a front face of the backrest, the upholstery having at least one through slit, adapted to accommodate a headrest support rod;

fixing the upholstery onto the backrest armature;

fixing the at least two trim elements so as to form a passage for each headrest support rod, the second trim element covering at least partially the at least one slit.

In illustrative embodiments, a method for manufacturing a vehicle seat is described, comprising the steps of:

providing a seating base with a seating base armature;

assembling a backrest by implementing a assembling method of a motor vehicle seat backrest as described above in all its combinations; and fixing the backrest to the seating base, preferably so that the backrest can pivot about a axis transverse with respect to the seating base.

In illustrative embodiments, a method for replacing upholstery of a vehicle seat backrest as described above is also described, in all its combinations, including the steps of:

i) removing the first and second trim elements;

ii) removing the upholstery from the backrest armature;

iii) fixing another upholstery onto the backrest armature; and iv) fixing first and second trim elements, the first and second trim elements being preferably the same in steps i) and iv).

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

Figure 2:
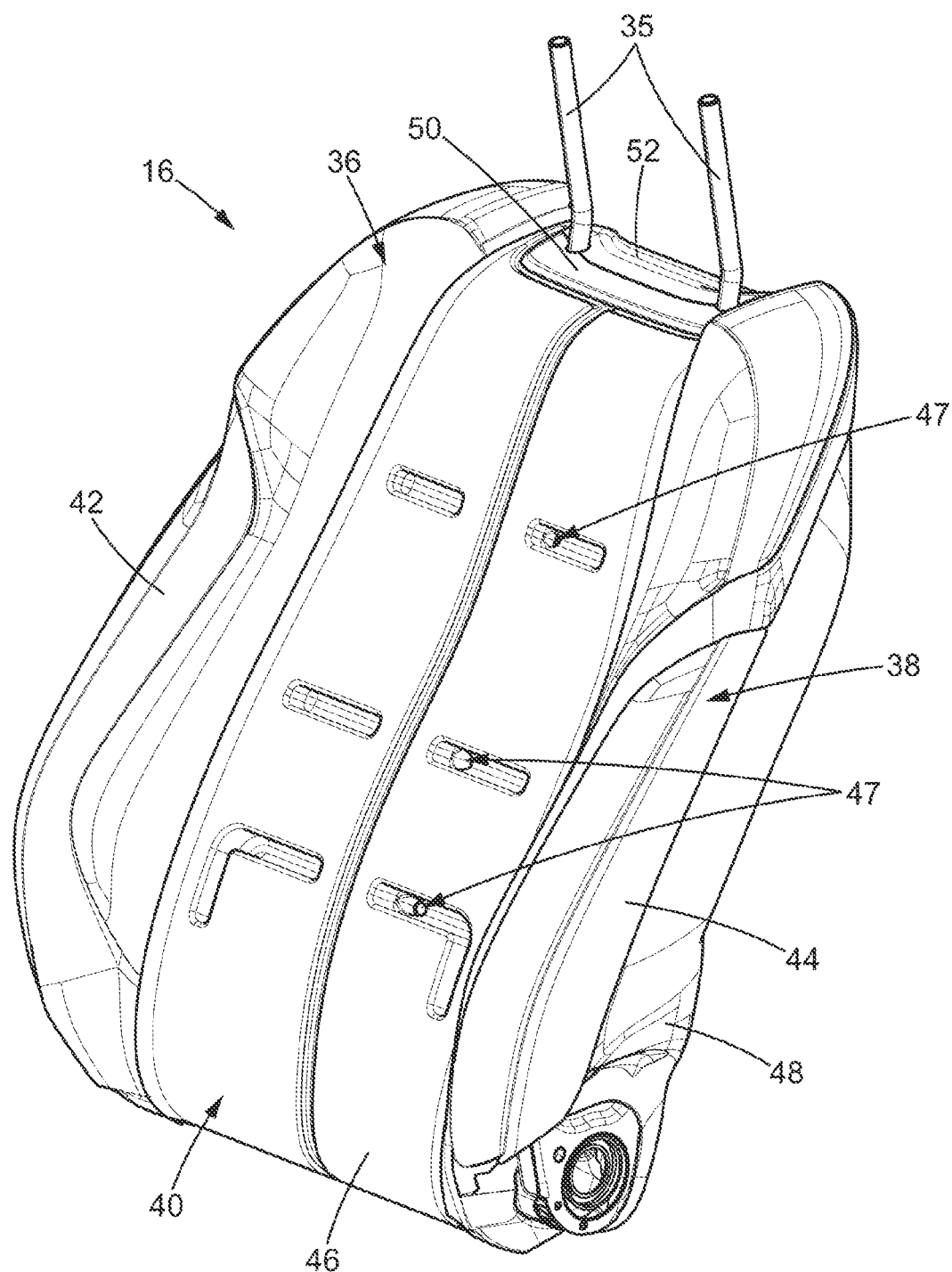
Figure 3:
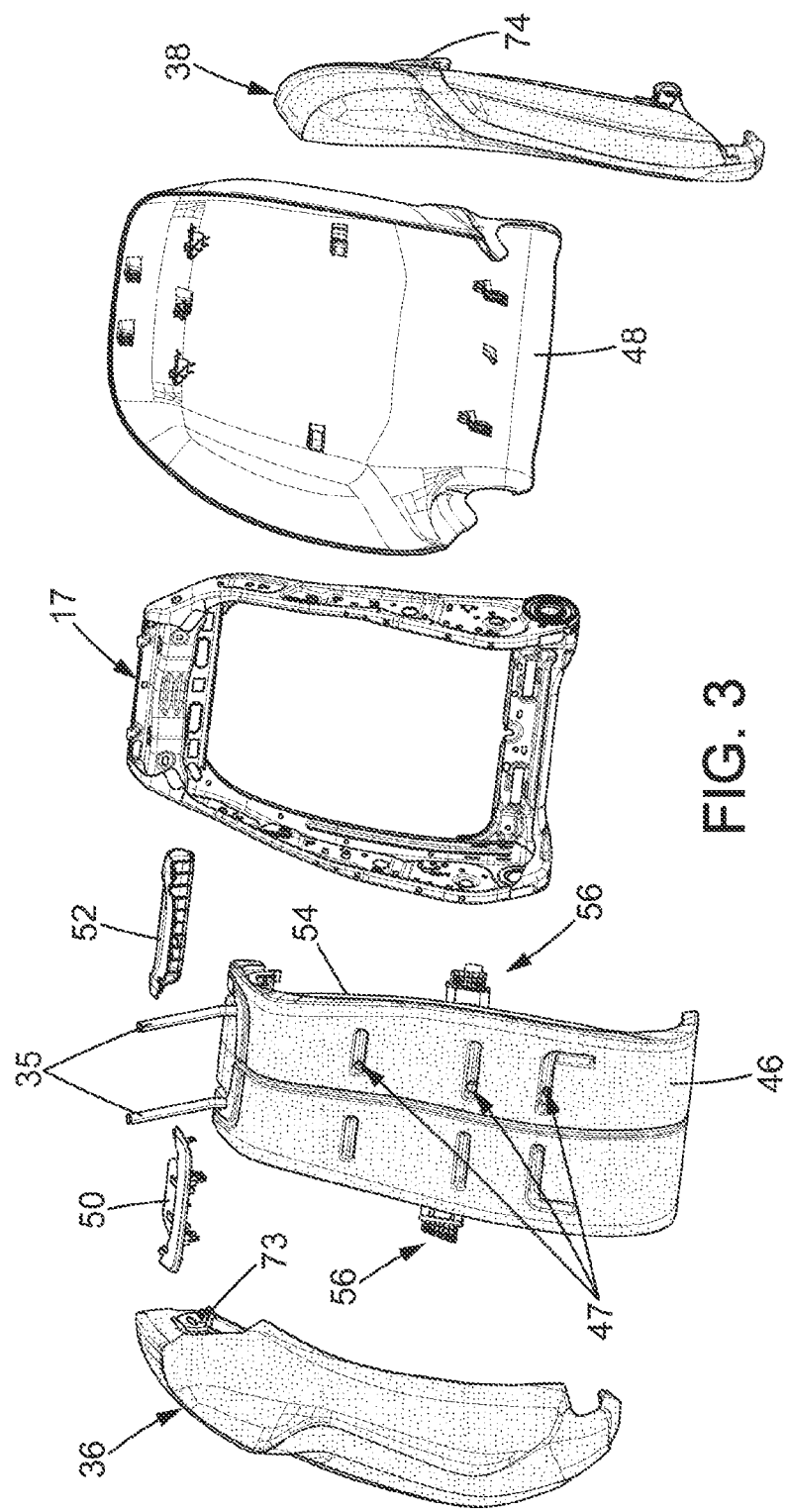
Figure 4:
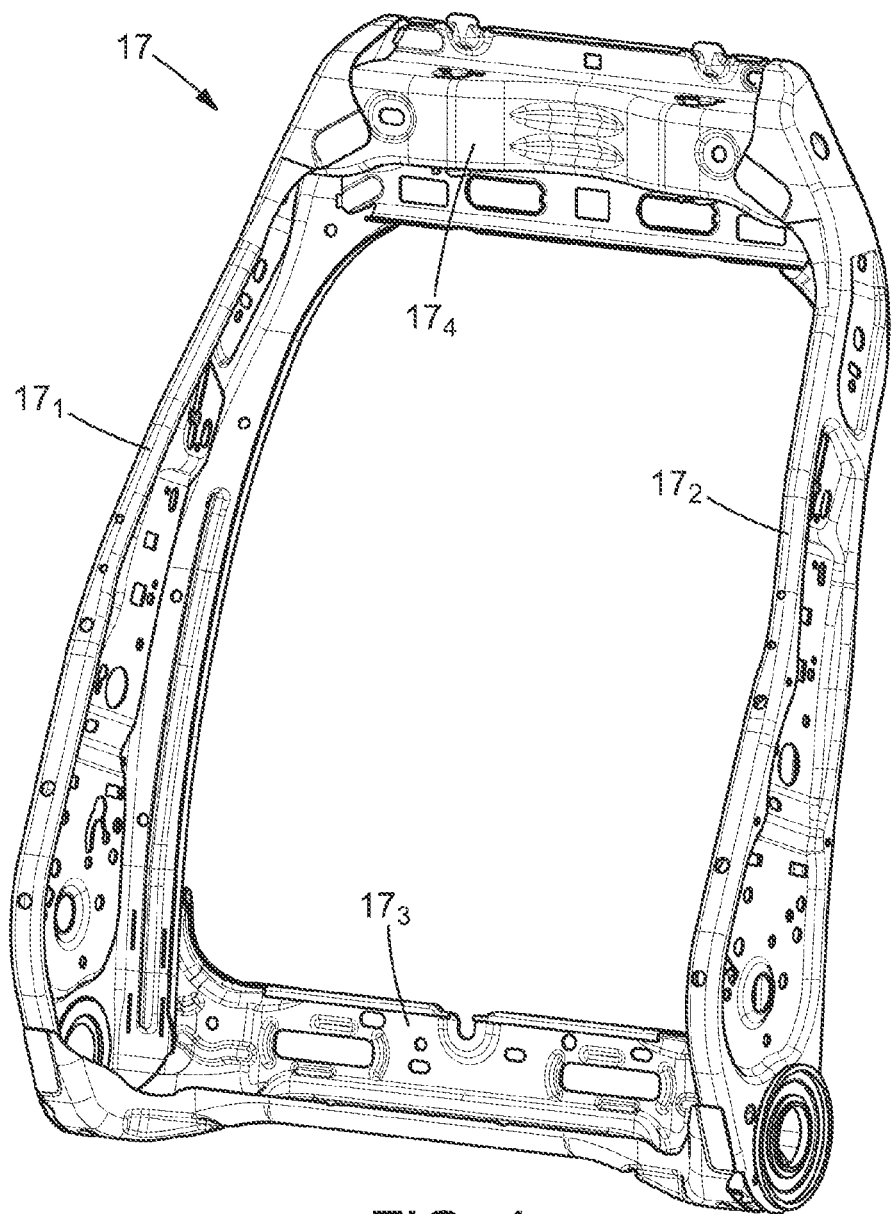
Figure 5:
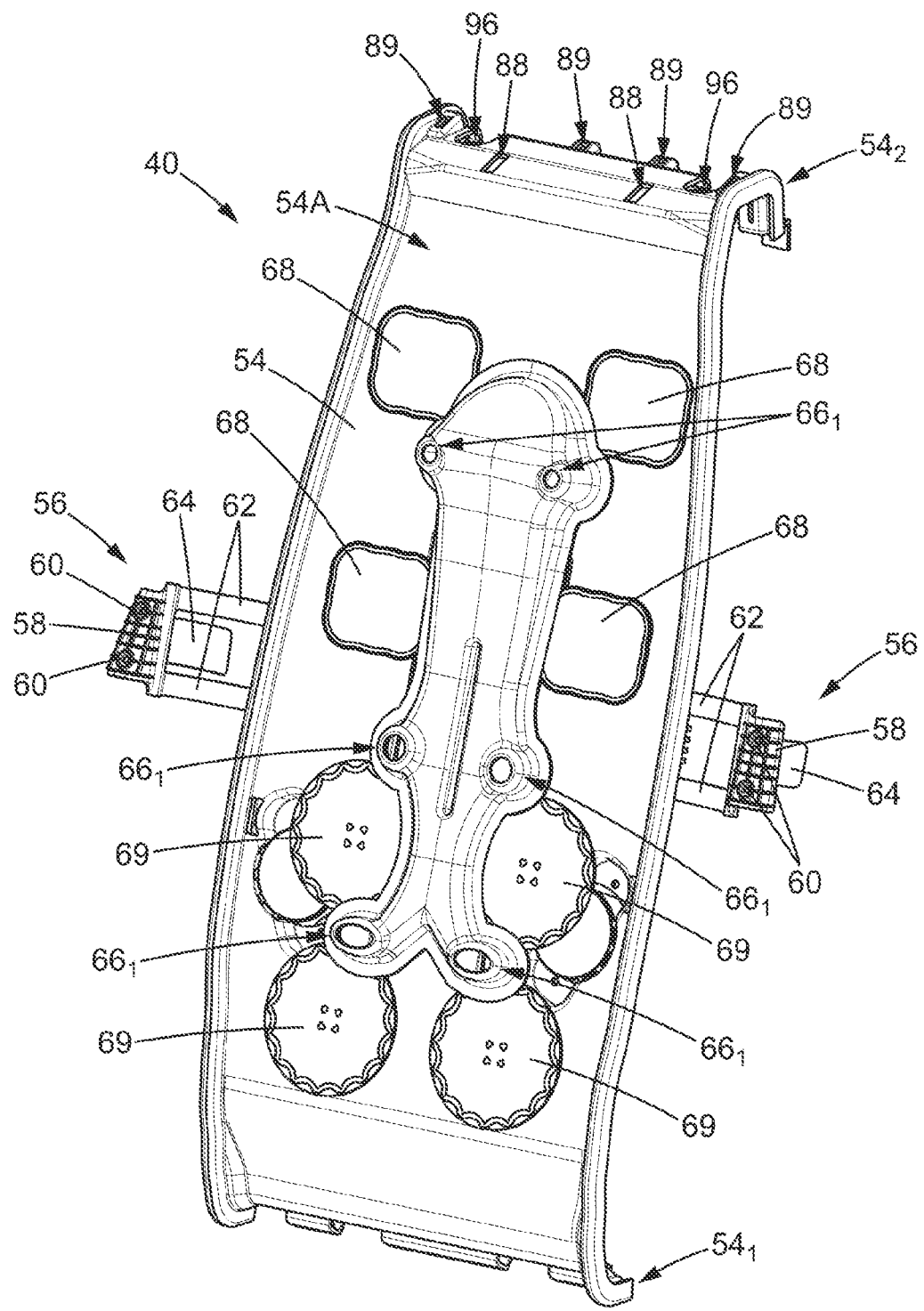
Figure 6:
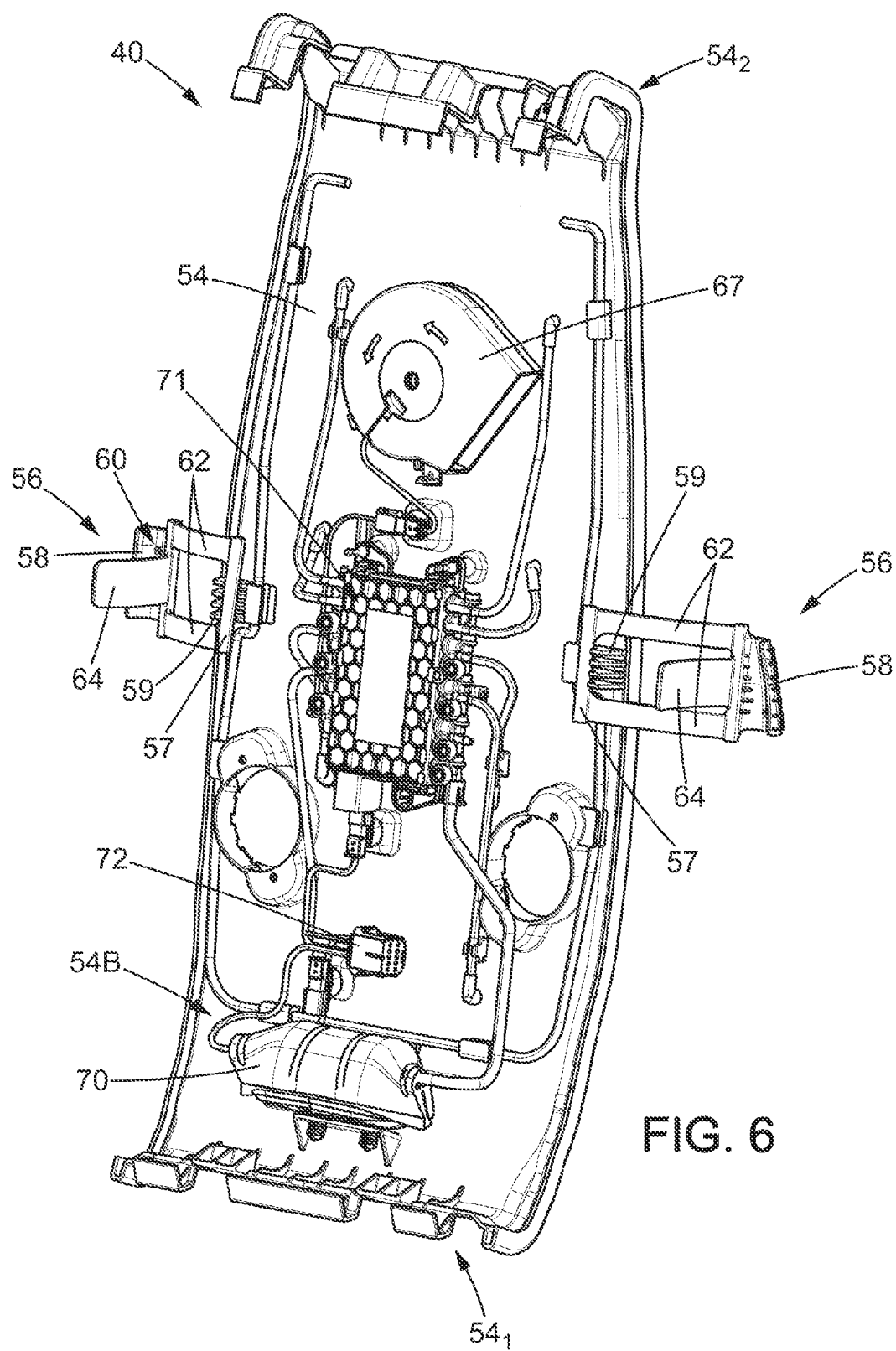
Figure 7:
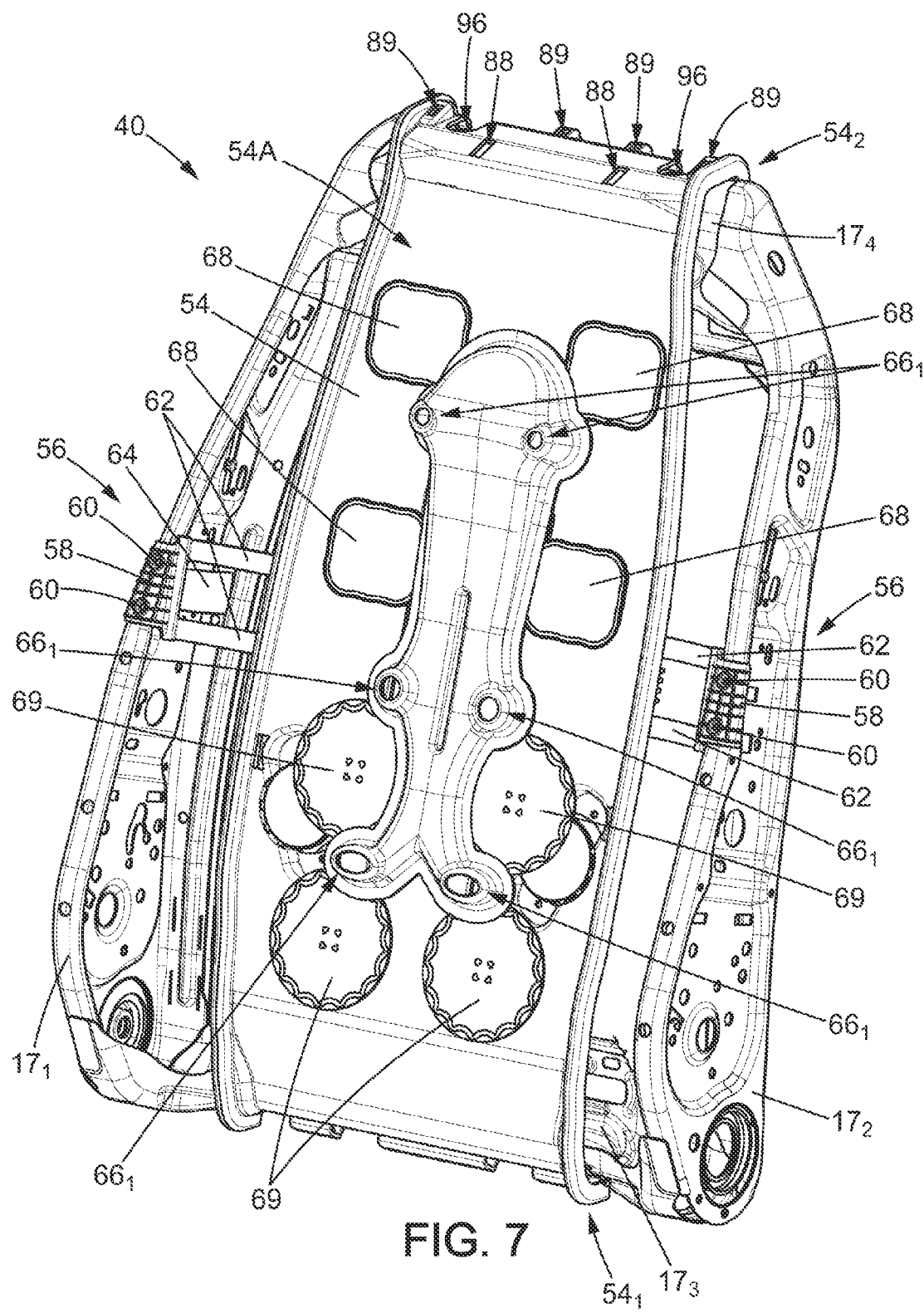
Figure 8:
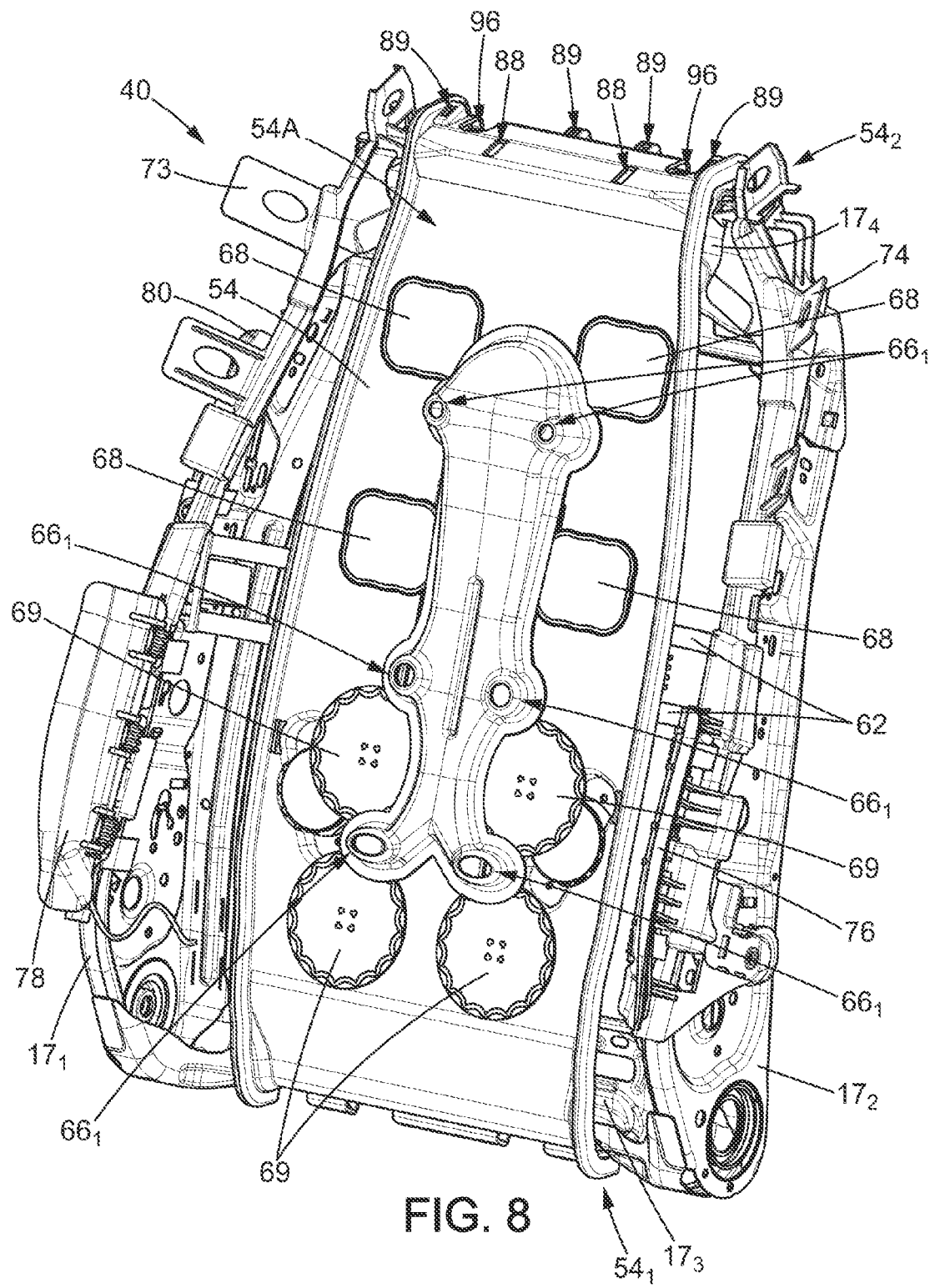
Figure 9:
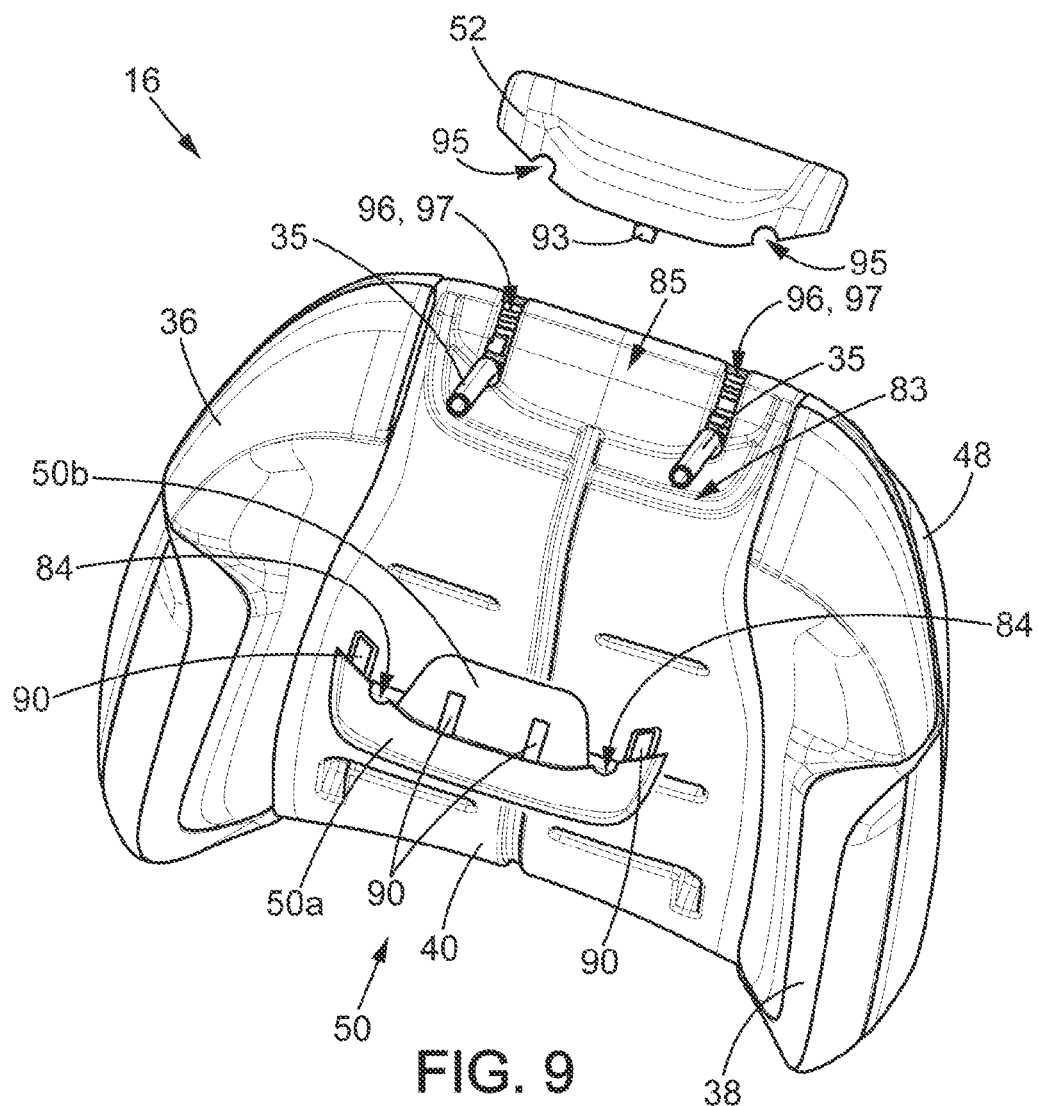
Figure 10:
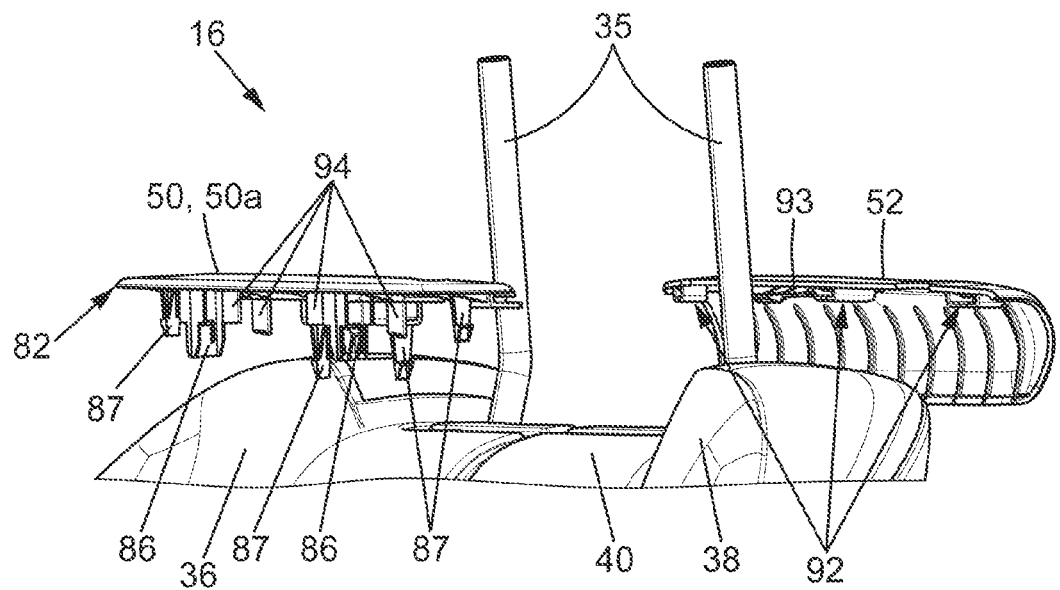
Figure 11:
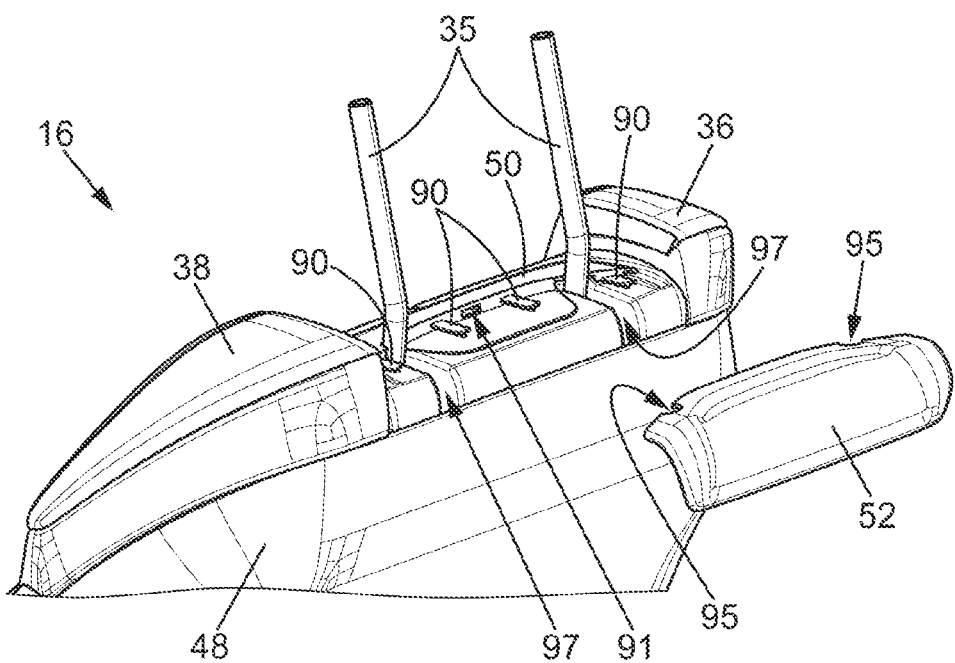
Figure 12:
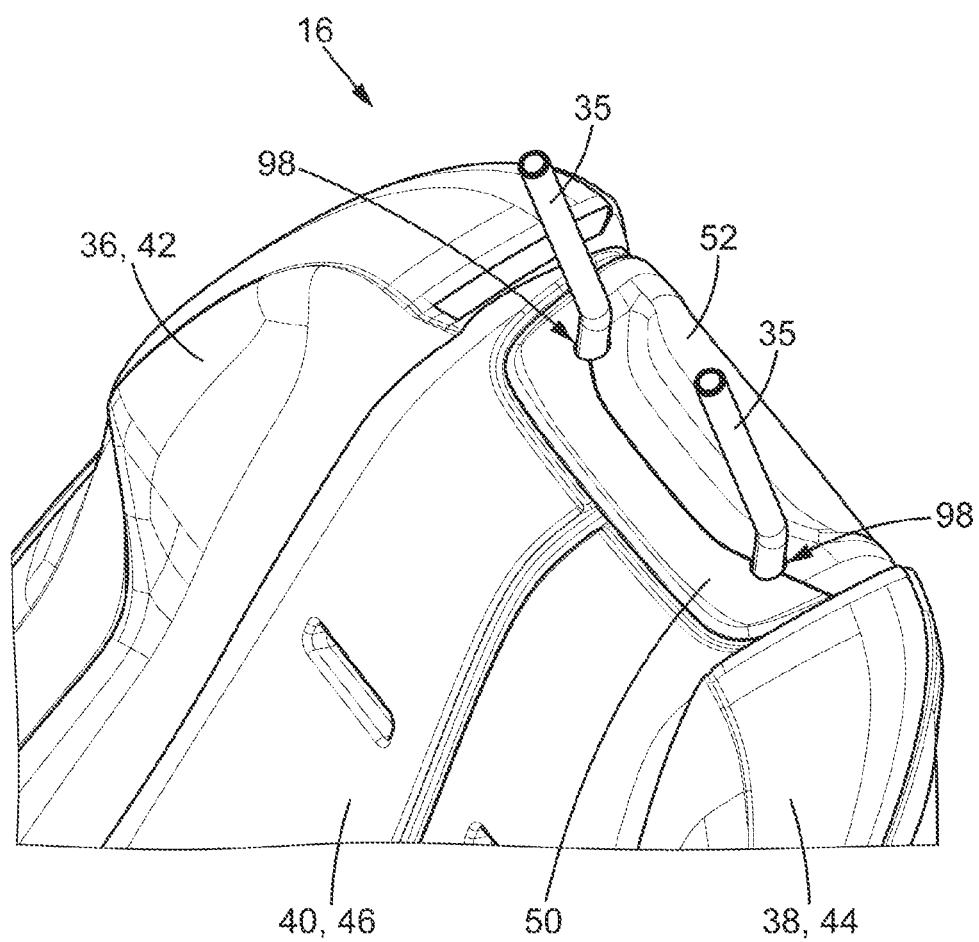
Figure 13:
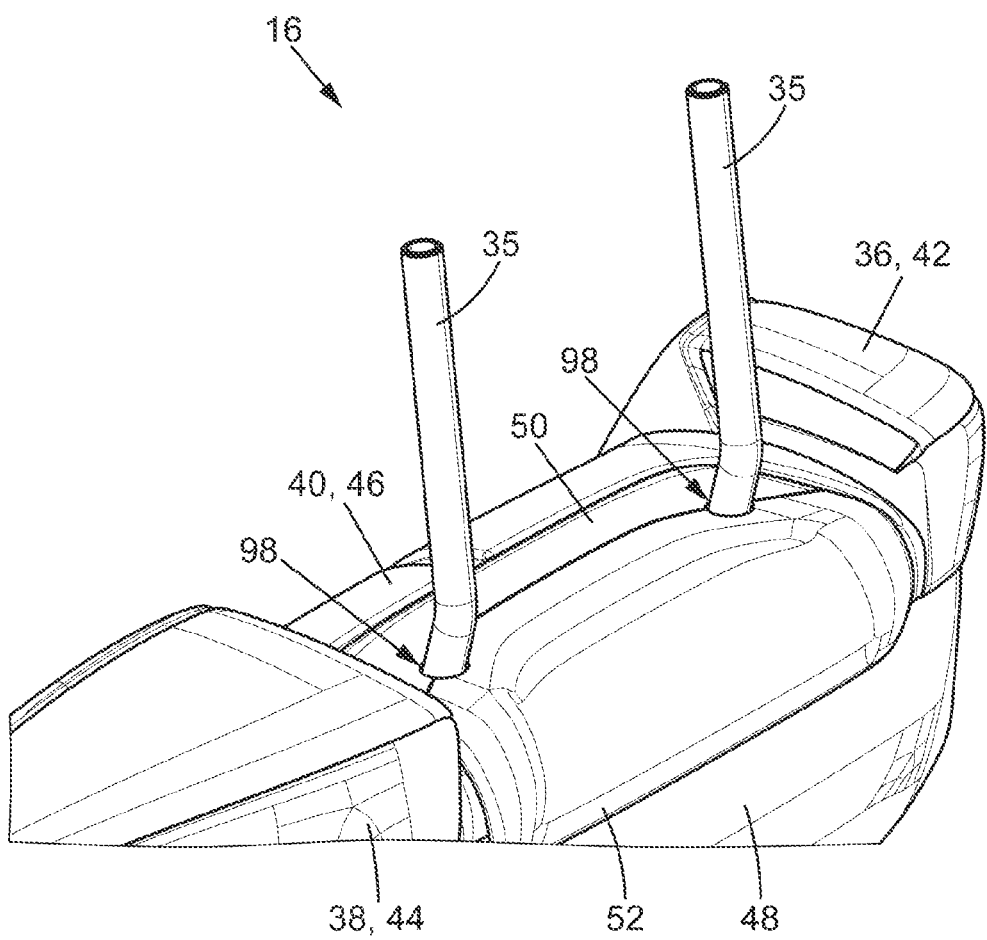

The detailed description particularly refers to the accompanying figures in which:

FIG. 1 schematically shows a side view of an example of a vehicle seat;

FIG. 2 schematically shows in perspective the backrest of the vehicle seat of FIG. 1;

FIG. 3 schematically shows an exploded view of the vehicle seat backrest of FIG. 2;

FIG. 4 shows schematically in perspective the armature of the vehicle seat backrest of FIG. 2 and FIG. 3;

FIG. 5 schematically shows in perspective a first face of a central upholstery module support implemented in the vehicle seat backrest of FIG. 2 and FIG. 3;

FIG. 6 schematically shows in perspective the second face, opposed to the first face, of the central upholstery module support of FIG. 5;

FIG. 7 schematically shows the central upholstery module support of FIG. 5 and FIG. 6 mounted on the backrest armature of FIG. 4;

FIG. 8 schematically shows a perspective view of the vehicle seat backrest of FIG. 2 and FIG. 3, without the foam blocks of the various upholstery modules;

FIG. 9 schematically shows an exploded view of a detail of the backrest of FIG. 2 in a first perspective view;

FIG. 10 schematically shows an exploded view of the detail of the backrest of FIG. 9 in a second perspective view;

FIG. 11 schematically shows an exploded view of the detail of the backrest of FIG. 9 and FIG. 10, according to a third perspective, one of the trim elements being placed in position;

FIG. 12 schematically shows the detail of the backrest of FIG. 9, the two trim elements being placed in position; and FIG. 13 schematically shows the detail of the backrest of FIG. 9, in a different perspective view from that of FIG. 12, the two trim elements being placed in position.

DETAILED DESCRIPTION

On the different figures, the same reference signs designate identical or similar features. For the sake of brevity, only the features that are useful to understand the embodiment described therein are shown on the figures and are described in detail in the following.

In the following description, when referring to absolute position qualifiers, such as "front", "back", "up", "down", "left", "right", etc., or relative position qualifiers, such as "above", "below", "upper", "lower", etc., or to orientation qualifiers, such as "horizontal", "vertical", etc., reference shall be made, unless otherwise specified, to the orientation of figures or of a vehicle seat in its normal position of use.

In particular, the longitudinal direction X means the seat longitudinal direction. The seat longitudinal direction shall be construed as being the same as the longitudinal direction of the automotive vehicle in which the seat is mounted. This longitudinal direction X corresponds to the normal running direction of the vehicle. The longitudinal direction X is horizontal. The seat transverse direction Y thus corresponds to the transverse or lateral direction of the automotive vehicle. This transverse direction corresponds to a direction perpendicular to the vehicle normal running direction. The transverse direction Y is horizontal. Finally, the vertical direction Z is a seat vertical direction, perpendicular to both longitudinal and transverse directions.

FIG. 1 schematically shows a motor vehicle seat 10 mounted on a runner mechanism 12.

The seat 10 comprises a seating base 14, with a seating base armature 15, on which a backrest 16, with a backrest armature 17, is mounted. The backrest armature 17 is herein pivotable about a transverse axis 18, relative to the seating base armature 15. To this end, an articulation mechanism 20 is arranged between the seating base armature 15 and the backrest armature 17.

The seating base 14 is mounted on mobile profiles 22, also called slides or male profiles, by means of feet 24, 26. Each mobile profile 22 is part of a runner 12 and is associated with a fixed profile 28. The fixed profile 28 is also called a rail or a female profile. The fixed profile 28 is fixed to the floor 30 of a motor vehicle.

The seat 10 comprises in this example a manual control element 32, called a lifter, for slidingly controlling the runners 12. This manual control element 32 makes it possible in particular to block and unblock sliding stopping systems of the mobile profiles 22 with respect to the respective fixed profiles 28. Once the stopping systems have been released, the manual control element 32 can also be used to slide the mobile profiles 22 relative to their respective fixed profiles 28 of the runner 12 in the longitudinal direction X of the runners 12. The fixed 28 and mobile 22 profiles of the runners 12 are generally metallic.

Alternatively, the movement of the mobile profiles 22 with respect to the fixed profiles 28 is controlled using an actuator.

According to the illustrated example, the seat 10 can also include a headrest 34, with a headrest armature 35, partially visible in FIG. 2, in the form of rods 35 fixed to the backrest armature 17.

Hereinafter, the backrest 16 of the vehicle seat 10 is described in more detail.

As can be seen in FIG. 2 in particular, the illustrated backrest 16 comprises a first side upholstery module 36, a second side upholstery module 38 and a central upholstery module 40, such that the first and second side upholstery modules 36, 38 are each arranged on a respective side of the central upholstery module 40. Each upholstery module 36, 38, 40 comprises here a foam block 42, 44, 46, the only visible element of the respective upholstery module in FIG. 2. As can be seen in particular in FIG. 2, the foam block 46 of the central upholstery module 40 may include holes 47. These holes 47 allow ventilation of the seat occupant back, as will be described later.

In the illustrated example, the central upholstery module 40 forms the leaning face of the backrest cup 16, that is to say the central part for the back of the seat occupant to lean on, while the lateral modules 36, 38 form the lateral portions projecting with respect to the cup of this same face for the back of the seat occupant to lean on.

It should be noted here that the upholstery modules 36, 38, 40 exist before to being fixed onto the backrest armature 17. Thus, these upholstery modules 36, 38, 40 are not produced by overmolding the backrest armature 17 and/or structural elements already attached to the backrest armature 17. This does not prevent the foam blocks 42, 44, 46 of the different upholstery modules 36, 38, 40 from being produced by overmolding a possible support for the respective upholstery module 36, 38, 40. However, such overmolding is carried out prior to the support being fixed onto the backrest armature 17.

The backrest 16 also comprises a shell 48, hereinafter referred to as the "rear shell", defining most of the backrest 16 rear face. The backrest 16 further comprises, according to the illustrated example, two upper trim elements 50, 52. The two trim elements 50, 52 surround the support rods 35 of the headrest 34. Fixing the two trim elements 50, 52 will be described in more detail below.

Remarkably, herein and as illustrated schematically in FIG. 3, each upholstery module 36, 38, 40 is fixed to the backrest armature 17, independently of the other two upholstery modules 36, 38, 40. In other words, each upholstery module 36, 38, 40 can be fixed to the backrest armature 17 while the other two upholstery modules 36, 38, 40 are not fixed to the backrest armature 17. Thus, each upholstery module 36, 38, 40 is able to be fixed onto the backrest armature 17 independently of the other two upholstery module 36, 38, 40. An upholstery module 36, 38, 40 may however be fixed to another upholstery module 36, 38, 40. However, preferably, the upholstery modules 36, 38, 40 are independent in that there is no direct fixation of a upholstery module 36, 38, 40 to another upholstery module 36, 38, 40. The foam block 46 of the central upholstery module 40 can however be mounted squeezed between the foam blocks 42, 44 of the two side upholstery modules 36, 38.

The rear shell 48 can also be directly fixed to the backrest armature 17, preferably independently of the upholstery modules 36, 38, 40. The rear shell 48 can be fixed to the backrest armature 17 by any suitable means, in particular by screwing or riveting. According to yet another example, the rear shell 48 is elastically interlocked onto the backrest armature 17. Advantageously, the rear shell 48 is adapted to be fixed onto the backrest armature 17 after fixing the upholstery modules 36, 38, 40. This can indeed allow access from the seat 10 rear, to the various elements of the upholstery modules 36, 38, 40 needing to be connected functionally, after the upholstery modules 36, 38, 40 have been fixed onto the backrest armature 17, before fixing the rear shell 48.

As illustrated in FIG. 4, the backrest armature 17 comprises a first column $17_1$, a second column $17_2$, a first cross member $17_3$, hereinafter referred to as "lower cross member $17_3$", and a second cross member $17_4$, hereinafter referred to as "upper cross member $17_4$". The columns $17_1$, $17_2$ and the cross members $17_3$, $17_4$ form a backrest armature 17 in the form of a frame. To this end, the columns $17_1$, $17_2$, and the cross members $17_3$, $17_4$ may be fixed together, in particular welded together. Alternatively, the backrest armature 17 is in one piece, the latter being for example molded.

On the backrest armature 17, the central upholstery module 40 illustrated in FIGS. 5 and 6 is fixed, respectively in front view and in rear view, without the associated foam block 46.

In these figures, the central upholstery module 40 comprises a support 54, herein shaped as a plate. The support 54 is in particular more rigid than the foam block 46 of the central upholstery module 40. The foam block 46 of the central upholstery module 40 is fixed to support 54. In particular, the foam block 46 can be overmolded on support 54. Alternatively, the foam block 46 can be glued or elastically interlocked on the support 54, the foam block 46 preferably having plastic inserts in the latter case, forming elastic interlocking reliefs on the support 54.

The support 54 extends substantially in a longitudinal direction. The longitudinal ends $54_1$, $54_2$ of the support 54 are curved herein. Thus, the upper end $54_2$ of the support 54 can rest on the upper cross member $17_4$ of the backrest armature 17, as illustrated in FIG. 7. Similarly, the lower end $54_1$ of the support 54 can accommodate the lower cross member $17_3$ of the backrest armature 17 as can be seen in FIG. 7. The ends $54_1$, $54_2$ herein have means for fixation to the lower $17_3$ and upper $17_4$ cross members, respectively, of the backrest armature 17. These fixing means may in particular include:

complementary reliefs, for example for force-fixing the central upholstery module 40 onto the backrest armature 17; and/or corresponding holes for fixing by means of screws, bolts or rivets, for example; and or complementary elastic interlocking reliefs (or clips), for fixing by elastic interlocking. The latter solution appears to be the most favorable, limiting the number of parts and operations used to fix the support 54 onto the backrest armature 17.

In addition, according to the illustrated example, the central upholstery module 40 may further include straps 56 limiting the support 54 deflection relative to the backrest armature 17. Here, the straps 56 also make it possible to fix the support 54 on the columns $17_1$, $17_2$ of the backrest armature 17. Each strap 56 herein comprises a beam 57, in contact with support 54. Here, the beam 57 is fixed to the support 54. To this end, the support 54 comprises, in the illustrated example, hooks 59 for elastic interlocking of a respective beam 57. It should be noted here that the hooks 59 are on the face 54B of the support 54 which is opposite the face 54A intended to be oriented towards the seat occupant. This ensures better comfort for the occupant and/or better support 54 hold, in particular against the support 54 deflection when an occupant is leaning against the backrest 16. According to a first variation, the straps 56 can be fixed onto the support 54 before the central upholstery module 40 being mounted onto the backrest armature 17. According to another variant, the straps 56 are fixed to the backrest armature 17 prior to the central upholstery module 40 being mounted onto the backrest armature 17. In this case, when assembling the central upholstery module 40, the beams 57 fit elastically into the hooks 59 by simple relative movement of the central upholstery module 40 in the direction of the backrest armature 17.

Each strap 56 further comprises at least a first blade 62, herein two blades 62. Each first blade 62 extends from a respective beam 57. The first blades 62 are advantageously more flexible than support 54. The first blades 62 ensure a more flexible support 54 hold when a seat occupant leans against the backrest 16.

At the end of the first blades 62, opposite the beam 57, each strap 56 defines a housing 58 for accommodating a portion of a respective column $17_1$, $17_2$, and holes 60 provided on the wall forming the housing 58, which are intended to be arranged facing corresponding holes on the columns $17_1$, $17_2$, for fixing by screw, bolt or rivet, in particular.

In addition, in the illustrated example, each strap 56 comprises a second blade 64, oriented substantially perpendicular to the first blades 62 and which can each be bearing on a respective column $17_1$, $17_2$ of the backrest armature 17. These second elastic blades 64 ensure the beam 57 of the relevant strap 56 to be correctly positioned towards the front of the backrest 16. These second blades 64 are preferably more rigid than the first blades 62. The second blades 64, here compressed between the support 54 and the backrest armature 17 tend to push back the support 54, thus limiting the support 54 deflection relative to the backrest armature 17 when a seat occupant leans against the backrest 16. The elasticity of the blades 62, 64 further provides comfort to the vehicle seat occupant, in that the support 54 can move slightly relative to the backrest armature 17, by elastic deformation of the blades 62, 64.

The straps 56, in order to be fixed to the backrest armature 17, may in particular include:
complementary reliefs, for example for force-fixing the straps 56 onto the backrest armature 17; and/or
corresponding holes for fixing by means of screws, bolts or rivets, for example; and or
complementary elastic interlocking reliefs (or clips), for fixing by elastic interlocking.

As can be seen in FIGS. 4 to 8, support 54 can be equipped with different elements each associated with one or several comfort functions for the seat 10 occupant.

According to the illustrated example, an air guide 66 is thus fixed to the support 54, in a sealed manner. The air guide 66 has holes $66_1$ intended to be arranged substantially opposite the holes 47 formed in the foam block 46 of the central upholstery module 40. This air guide 66 is arranged at a through opening formed in the support 54, a fan 67 being fixed on the opposite face 54B of the support 54 to blow air into the air guide 66. Advantageously, the air guide 66 can have an ergonomic shape ensuring that the vehicle seat occupant back is more comfortably accommodated. This function for more comfortably accommodating the seat occupant back may, in a variation, be provided by an element separate from an air guide 66.

Furthermore, inflatable pouches 68, 69 are fixed on the support 54, here on the face 54A of the support 54 intended to be oriented towards the back of the seat 10 occupant. In the illustrated example, the inflatable pouches 68, 69 are substantially regularly distributed on the support 54, in a matrix. In the example of FIG. 5, eight inflatable pouches 68, 69 are thus distributed in four rows of two columns of inflatable pouches 68, 69. The eight inflatable pouches 68, 69 can be selectively supplied with air by an air pump 70, via a valve 71. Thus, by controlling the valve 71 according to a particular inflation scheme applied to the inflatable pouches 68, 69, it is possible to obtain a massaging effect on the seat 10 occupant back. Alternatively, all the inflatable pouches 68, 69 can be supplied with air simultaneously, in particular to improve holding the seat occupant back, wherein the inflatable pouches 68, 69 inflate until they adjust to the shape of the seat occupant back. According to yet another alternative, part of the inflatable pouches 68 makes it possible to massage a part of the seat 10 occupant back, in particular the upper part of the back, while the other part of the inflatable pouches 69 performs a holding function for the seat occupant back, in particular a holding function for a low part of the seat occupant back.

Other comfort functions can be associated with the support 54. In particular one or several loudspeakers and/or one or several vibrating devices (or in English "exciter") and/or one or several resistive heating wires for the vehicle seat 10 occupant back may be fixed to support 54. Preferably, the loudspeaker/s and/or the vibrating device/s and/or the resistive wire/s are arranged between the support 54 and the foam block 46 of the central upholstery module 40 or at least partially housed in the foam block 46 of the central upholstery module 40.

Preferably, all the elements fixed to the support 54 using an electrical power supply and/or a control from outside the seat and/or an information transfer to outside the seat are electrically connected to a single connector 72 providing the link with outside the seat. Thus, mounting the seat is greatly simplified, only further using an electrical connection between outside the seat and the connector 72 to supply electric power, to control and to communicate with the adapted elements of the central upholstery module 40. The connector 72 is advantageously arranged on the face 54B of the support 54 intended to be opposite the back of the seat occupant.

Furthermore, as can be seen in particular in FIG. 7, on each column $17_1$, $17_2$ of the backrest armature 17, a support 73, 74 of the first lateral upholstery module 36 and of the second lateral upholstery module 38, is respectively fixed. Each of the support 73, 74 can be fixed to the associated column $17_1$, $17_2$ by elastic interlocking and/or screwing and/or riveting and/or force-fixing, in particular.

On each support 73, 74, the foam block 42, 44 associated with the first or second side upholstery module 36, 38 is fixed. In particular, each foam block 42, 44 can be overmolded on the respective support 73, 74. Each foam block 42, 44 can alternatively be glued or elastically interlocked on the associated support 73, 74. In the latter case, the foam blocks 42, 44 may include plastic inserts.

An inflatable pouch 76, 78 of a device for adjusting the lateral hold of the seat occupant back (in English "bolster") is fixed on each support 73, 74 of the lateral module.

On the support 73 of the first side upholstery module 36 illustrated in FIG. 8, an inflatable pouch 78 and a pump 80 adapted to inflate the inflatable pouch 78 are fixed. The inflatable pouch 78 has a comfort function rather than a safety function, in that it may allow a massaging effect and/or a better adaptation of the side upholstery module 36 shape to the seat occupant. An air pump 80 can also be fixed to the support 74 of the other side upholstery module, in order to inflate the associated inflatable pouch 78. Advantageously, in fact, an air pump 80 is arranged in each side upholstery module 36, 38 to avoid an aeraulic connection between a upholstery module 36, 38, 40 and another one 36, 38 40.

Each side upholstery module 36, 38 may further be provided with one or several massaging inflatable cushions and/or a lateral airbag device. The side upholstery module 36 or 38 can be preliminarily provided with the airbag 80, before assembling it onto the armature.

Here again, the side upholstery modules 36, 38 can include other comfort functions.

As with the central upholstery module 40, the elements of each side upholstery module 36, 38 using electrical power supply, control, or information transfer, are preferably electrically linked to a single connector of each side upholstery module 36, 38. Assembling the seat backrest is thus simplified.

The backrest 10 as described above is particularly easy to mount in.

Thus, a method of mounting such a backrest may include a first step consisting of providing a backrest armature 17 and the three upholstery modules 36, 38, 40. At this stage, the backrest armature 17 may possibly already be fixed to the seating base armature 15 and/or be already accommodating the headrest armature 35 in whole or in part. In particular, the support rods of the headrest may already be fixed on the backrest armature 17.

Secondly, the upholstery modules 36, 38, 40 are fixed onto the backrest armature 17. The fixing sequence of the upholstery modules 36, 38, 40 may in particular depend on the geometry of the supports 54, 73, 74 of the various upholstery modules 36, 38, 40 and of their fixations to the backrest armature 17. According to the backrest example described above, it is possible, e.g., to start by fixing the central upholstery module 40, then the two side modules 36, 38. Alternatively, however, the central upholstery module 40 can be fixed after the two side modules 36, 38 having been fixed.

It should be noted that these successive fixing operations can be carried out in whole or in part, by an automaton. In particular, the central upholstery module 40 may be "hooked" on the upper cross member 17$_4$ of the backrest armature 17, then the lower end 54$_1$ can be fixed on the lower cross member 17$_3$ of the backrest armature 17. Screwing the second fixing means 56 can take place after this step. By "hooked" is meant herein that the folded-back end 54$_2$ of the support 54 of the central upholstery module 40 bears on the upper cross member 17$_4$ of the backrest armature 17, wherein complementary reliefs of the folded end 54$_2$ of the support 54, on the one hand, and of the backrest armature 17 and/or of the headrest armature 35, on the other hand, guide a rotational movement of the support 54 with respect to a transverse extension axis of the upper cross member 17$_4$ of the backrest armature 17. Herein, for example, notches or slits made at the end 54$_2$ of the support 54 and accommodating the headrest support rods 35 allow guiding the movement of the central upholstery module 40 with respect to the backrest armature 17.

The electrical or even aeraulic connections are then made. Preferably, only one electrical connection is to be made for each upholstery module 36, 38, 40.

Finally, the rear shell 48 is fixed onto the backrest armature 17 and the trim elements 50, 52. Here again, the fixing sequence of the rear shell 48 and the trim elements 50, 52 may vary.

Mounting the seat 10 as described above is very simple to achieve. In addition, it can be identical or substantially identical, regardless of the functions integrated or not in the backrest 16. It is thus possible to provide a single automaton to mount a wide variety of separate vehicle seat backrests, with a substantially constant assembling time. The assembly line for such a range of seats is thus simpler and easier to manage.

In the following, the trim elements 50, 52 and the fixation operation thereof onto the backrest 16 are described in more detail, with reference to FIGS. 9 to 12.

As can be seen in particular in FIG. 9, a first trim element 50 is adapted to be assembled onto the backrest 16 over a front face of the backrest 16, intended to be oriented towards a seat occupant. The first trim element 50 comprises a first substantially planar part 50$a$, with a rib 82 extending at least at the front end of the first part 50$a$. Herein, the rib 82 also extends over the lateral sides of the first part 50$a$ of the first trim element 50. The rib 82 can in particular be formed by a rim of the first trim element 50. This rib 82 is accommodated in a complementary groove 83, formed on the foam block 46 of the central upholstery module 40, in this case on a top end of the foam block 46 of the central upholstery module 40. Thus, accommodating the rib 82 in the groove 83 facilitates precise positioning of the first trim element 50 on the foam block 46 of the central upholstery module 40. The groove 83 extends here mainly in front of the headrest support rods 35.

The first trim element 50 also comprises two first notches 84, made here on the end of the first part 50$a$ of the first trim element 50, devoid of rib 82. Herein, the notches 84 are shaped as circular arcs, having a radius substantially equal to the radius of the headrest support rods 35. In this case, the notches 84 are symmetrical with respect to a median plane of the first trim element 50.

The first trim element 50 also has a flat second part 50$b$. The second part 50$b$ of the first trim element 50 extends from the first part 50$a$. The first and second parts 50$a$, 50$b$ of the first trim element 50 form a step, the second part 50$b$ extends lower than the first part 50$a$. The second part 50$b$ of the first trim element 50 is thus adapted to be accommodated in a complementary recess 85, formed by the foam block 46 of the central upholstery module 40. The recess 85 may be at least partly behind the headrest support rods 35, in the longitudinal direction X of the seat 10. Here, the recess 85 is mainly behind the headrest support rods 35.

The first trim element 50 is also provided with fixing means 86, 87 for fixing it to the support plate 54 of the central upholstery module 40. In this case, these fixing means 86, 87 comprise first elastic interlocking reliefs 86 adapted to cooperate with first openings 88 in the support plate 54. Here, the first openings 88 are made on the upper curved end 54$_2$ of the support plate 54. The first elastic interlocking reliefs 86 of the first trim element 50 extend from the first part 50$a$ of the first trim element 50. The first elastic interlocking reliefs 85 of the first trim element 50 extend in a substantially normal direction to the first part 50$a$ of the first trim element 50. The first elastic interlocking reliefs 85 of the first trim element 50 are here rigid pins each provided with an elastically deformable tab, in the vicinity of a free end of each rigid pin.

The means 86, 87 for fixing the first trim element 50 on the support plate 54 of the central upholstery module 40 also comprise second elastic interlocking reliefs 87, in this case elastic interlocking tabs, elastically deformable. The second elastic interlocking reliefs 87 are adapted to be accommodated in second openings 89 in the support plate 54. Here, the second openings 89 are made on the upper curved end 54$_2$ of the support plate 54. Two elastic interlocking tabs 87 extend herein from the first part 50$a$ of the first trim element

50, in a direction normal to the first part 50a. Two elastic interlocking tabs 87 extend from the second part 50b of the first trim element, in a direction normal to the second part 50b.

The first trim element 50 and the second trim element 52 comprise guiding means 90, 92 complementary to a relative movement of the second trim element 52 with respect to the first trim element 50, until a fixing position of the second trim element 52, herein to the first trim element 50.

Herein, the guiding means 90, 92 comprise tongues 90 accommodated, preferably squeezed, in complementary housings 92 formed by the second trim element 52. Here, the two tongues 90 extend parallel to the longitudinal direction X of the vehicle seat 10. Here, the first trim element 52 comprises four such tongues 90 distributed over the width of the first trim element 52. Of course, the number of tongues 90 is not limited. The number of tongues 90 may on the contrary be equal to 1, 2, 3, 4 or more. The tongues 90 can have a dovetail shape. Of course, the shape of the tongues 90 is not limited. On the contrary, any projecting relief, in particular in the longitudinal direction X of the vehicle seat 10, can a priori be implemented, in combination with a female relief adapted to receive the projecting relief. It can also be noted that here the projecting reliefs are all on the first trim element 50 and that the complementary female reliefs are all on the second trim element 52. However, each of the first trim element 50 and the second trim element 52 may include one or several projecting reliefs and one or more complementary female reliefs.

The first trim element also comprises fixing means 91 for fixing it to the second trim element 52. The fixing means to the second trim element 52 comprise an opening 91, formed on the step between the first and second parts 50a, 50b of the first trim element 50. The opening 91 is adapted to accommodate an elastic interlocking tab 93 of the second trim element 52 which extends substantially parallel to the longitudinal direction X of the seat 10.

According to the illustrated example, the first trim element 50 also comprises vertical projections 94, extending herein from the first part 50a of the first trim element 50. The projections 94 have a spacer function, ensuring that the first part 50a of the first trim element 50 is kept at a distance with respect to the support plate 54. These projections 94 thus make it possible to determine the compression of the foam block 46 between the first trim element 50 and the support plate 54 of the central upholstery module 40.

The second trim element 52 is herein made in the form of a curved shell. The curvature of the second trim element 52 is adapted to cover the foam block 46 of the central upholstery module 40, in particular on the rear face of the backrest 16.

The second trim element 52 also includes two notches 95. The two notches 95 are shaped as circular arcs, having a radius substantially equal to the radius of the headrest support rods 35.

Fixing of the trim elements 50, 52 onto the backrest 16 is for example carried out as described below.

The central upholstery module 40 is fixed to the backrest armature 17, so that the two headrest support rods 35 are each accommodated in a respective slit 96, 97 of the foam block 46 and of the support plate 54 of the central upholstery module 40, as illustrated in FIG. 9]. Each slit 96, 97 has an outlet at a longitudinal end, intended to be oriented towards the rear of the vehicle seat 10. Advantageously, each headrest support rod 35 is received in the respective slit 96, in the vicinity or even in contact, with a closed end of the slit 96, opposite the longitudinal end of the slit 96 forming an outlet for the slit 96. It can be noted here that due to the presence of the slits 96, 97, the central upholstery module 40 can easily be placed onto the backrest armature 17 or removed therefrom. In particular, the central upholstery module 40 can be placed onto the backrest armature 17 by a movement substantially in the longitudinal direction X of the vehicle seat 10, possibly associated with a movement in a vertical direction Z, if necessary.

Preferably, the foam block 46 of the central upholstery module 40 is then also compressed between the support plate 54 and the shell 48.

The first trim element 50 is then fixed onto the central upholstery module 40. Herein, accommodating the rib 82 of the first trim element 50 in the complementary groove 83 and/or of the second part 50b in the recess 85 facilitates positioning the first trim element 50 on the central upholstery module 40. This contributes in particular to placing the elastic interlocking reliefs 86, 87 of the first trim element 50 facing the corresponding slits 88, 89, in the support plate 54 of the central upholstery module 40. The elastic interlocking reliefs 86, 87 are then elastically interlocked into the corresponding slits 88, 89. Herein, it is noted that due to the presence of the projections 94, the first part 50a of the first trim element 50 is kept at a distance from the support plate 54, thus making it possible to settle the pressure exerted by the support plate 54 and the first part 50a of the first trim element 50, onto the foam block 46 of the central upholstery module 40. The elastic interlocking reliefs 86, 87 then pass through the foam block 46 of the central upholstery module 40. Advantageously, suitable passages are formed in the foam block 46 to allow the elastic interlocking reliefs 88, 89 to pass.

It should be noted here that the first trim element 50 can be fixed from the front of the seat backrest 16.

Once the first trim element 50 is fixed on the support plate 54 of the central upholstery module 40, the notches 84 are facing, or even in contact, with the headrest support rods 35. The second trim element 52 is then fixed onto the first trim element 50. It is noted here that fixing the second trim element 52 is made from the rear of the seat backrest 16. To this end, the second trim element 52 is first placed facing the first trim element 50, so that the tongues 90 of the first trim element 50 are facing the complementary housings 92 of the second trim element 52. The second trim element 52 is then moved towards the first trim element 50, herein in the longitudinal direction X of the vehicle seat, this movement being guided by the tongues 90 being accommodated in the complementary housings 92. The relative movement of the second trim element 52 relative to the first trim element 50, is carried out until the tab 93 of the second trim element 52 is elastically interlocked in the corresponding opening 91 on the first trim element 50. Once the second trim element 52 is fixed on the first trim element, the notches 95 of the second trim element 52 are each facing a respective notch 84 of the first trim element 50. Each pair of notches 84, 95 of the first and second trim elements 50, 52 thus form a passage 98 for a respective headrest support rod 35.

Furthermore, the second trim element 52, once fixed, covers the slits 97 in the foam block 46 of the central upholstery module 40. Herein, the second trim element 52 also covers at least a part of the rear shell 48 upper edge.

It can be noted that in the example described above, the second trim element 52 is fixed only to the first trim element 50. It is thus particularly simple to assemble and/or disassemble the second trim element 52.

A upholstery module 36, 38, 40 of the seat 10 can easily be changed, without having to change the other upholstery modules 10, 36, 38, or even without having to disassemble them. It may be advantageous, for example, to replace the central upholstery module 40 with a central upholstery module 40 accommodating one or several new comfort functions as compared to the former central upholstery module 40. In this case, not removing the side upholstery modules means not to interfere with the safety functions of the seat, namely the two side airbags present in or associated with the side upholstery modules 36, 38. The failure risks of these safety systems after the operation of replacing the central upholstery module 40 are thus limited.

The present disclosure is not limited to the sole examples described above. On the contrary, the disclosure may have numerous variations accessible to those skilled in the art.

Thus, in the illustrated example, each upholstery module 36, 38, 40 comprises a support and a foam block fixed to the support. Alternatively, an upholstery module may be devoid of support, or even include a single foam block. When a upholstery module is devoid of support as described above, it may include rigid inserts, incorporated in the foam block, to facilitate fixation thereof to the backrest armature. Such inserts can be incorporated by overmolding the corresponding foam block on these inserts. The term "rigid" is here to be construed as meaning that the inserts are in particular more rigid than the foam.

The support 54 of the central upholstery module 40 can also take other forms than that described above. In particular, the support 54 may be a frame comprising two cross members, which are preferably rigid, and two columns, which are rigid or flexible, spring elements, in particular elastic wires extending between the cross members and/or between the columns. In this case, advantageously, the cross members are fixed to the cross members of the backrest armature. The columns of the support may then be free with respect to the columns of the backrest armature 17. Straps 56 may also be provided between the columns of the support thereby formed and the columns of the backrest armature 17, in particular when the columns are rigid. The foam block of the central upholstery module can then be overmolded onto the support 54, in particular onto the cross members of the support 54 in the form of a frame. Even when support 54 is not in the form of a plate as described above, one or several elements ensuring a comfort function can be fixed to the support 54. These elements are in particular those described above. This is especially true when the support has a frame shape as described above.

Also, each upholstery module 36, 38, 40 may include a cover covering all or part of the respective foam block 42, 44, 46. The cover may in particular be arranged in the mold serving for overmolding the foam block 42, 44, 46 onto the respective support 54, 73, 74. The cover then adheres to the foam block 42, 44, 46. Alternatively, the cover can be fixed on the foam block 42, 44, 46 and/or on the support 54, 73, 74 after forming the foam block 42, 44, 46. In other words, the cover can be placed onto the foam block 42, 44, 46 and/or onto the support 54, 73, 74. The cover is then fixed by any means accessible to those skilled in the art.

According to yet another variant, a single cover is implemented to cover the three foam blocks 42, 44, 46 of the upholstery modules 36, 38, 40. Here again, in this case, the cover is placed onto the foam blocks 42, 44, 46 and/or onto the respective supports 54, 73, 74 of the upholstery modules 36, 38, 40, or even onto the backrest armature 17 and/or onto the rear shell 48. And here again, fixing the cover is carried out by any means accessible to those skilled in the art.

Advantageously, each upholstery module 36, 38, 40 is trimmed independently of the other two, as described above.

Alternatively, however, it is conceivable that a foam block, for example, is shared by several upholstery modules, in particular by all the upholstery modules 36, 38, 40.

Finally, in the illustrated example, the straps 56 are fixed between the support 54 and the backrest armature 17. Alternatively, however, the straps can be fixed between the support 54 and the side modules 36, 38, in particular the supports 73, 74 of the side modules 36, 38. Straps 56 can also be fixed on the backrest armature 17 and/or on the supports 73, 74 of the side upholstery modules 36, 38, and only be in contact with the support 56, in particular with the face 54B of the support 54 which is not oriented towards the seat occupant.

Even in the case where the straps 56 are fixed in the side modules 36, 38, the central upholstery module 40 can still be fixed to the backrest armature 17, independently of it being fixed to the side modules 36, 38 via the straps 56.

More generally, in the example described above, each upholstery module 36, 38, 40 is fixed to the backrest armature 17 independently of the other upholstery modules 36, 38, 40. In other words, fixing means are implemented only between the backrest armature, on the one hand, and each of the upholstery modules 36, 38, 40, on the other hand. Alternatively, however, each upholstery module 36, 38, 40 can be fixed to the seat armature 17 independently of the other upholstery modules 36, 38, 40. Thus, although there are fixing means implemented between at least two upholstery modules 36, 38, 40, in particular between the central upholstery module 40 and one or both side upholstery modules 36, 38, each upholstery module 36, 38, 40 includes fixing means able to secure the relevant upholstery module to the backrest armature 17, independently of the other upholstery modules 36, 38, 40.

Furthermore, in the illustrated example, the backrest upholstery is produced in the form of modules. The upholstery can be made in a different way. It is however particularly advantageous that the upholstery can be assembled onto the backrest armature, from a front face of the backrest, without having to remove the headrest support rod/s. To this end, the upholstery advantageously has one slit per headrest support rod, opening so that the headrest support rod can be received into the slit, by a relative movement of the upholstery with respect to the backrest armature, in a longitudinal direction of the vehicle seat. This can in fact make it possible to be able to remove the upholstery from the backrest armature without having to remove the headrest support rod/s.

Also, in the illustrated example, the first trim element is fixed to the support plate of the central upholstery module by elastic interlocking. Other fixing means accessible to those skilled in the art can however be implemented. In addition, the first trim element 50 can be fixed, in addition or as an alternative, to the support plate, to the backrest armature, to the foam block of the central upholstery module or, more generally, to a support and/or to a foam block of the backrest upholstery.

Likewise, the second fixing element can be fixed, in addition or as an alternative, to the first trim element, to the backrest armature, to the support plate and/or to the foam block of the central upholstery module, or more generally, to a support and/or to a foam block of the backrest upholstery. Fixing means other than elastic interlocking fixing means can be implemented to fix the second trim element.

In the automotive field, in particular, a comparative vehicle seat backrest may be produced by covering a backrest armature with foam. The whole is then covered with a cover.

The comparative seat backrest may incorporate many comfort and/or safety functions. One comparative practice is to fix a support to the backrest armature, to mount the various elements used to achieve the comfort and/or safety functions onto the support or onto the backrest armature, then to cover the obtained assembly with foam. A cover then covers the whole.

Thus, depending on the number and the complexity of the functions to be integrated into the comparative backrest of a seat, assembling a comparative backrest differ significantly on an assembly line.

In addition, assembling such a comparative backrest may be carried out at least in part by an operator, who should therefore be capable to assemble the different variations of the same backrest.

There is therefore a need for a seat backrest that can be mounted in a substantially identical manner regardless of the functions that it incorporates, with a substantially constant mounting time.

Furthermore, there is a need for a seat backrest whose upholstery can be easily mounted onto the backrest armature and dismounted, if possible in a manner allowing easy replacement of the removed upholstery part.

To this latter end, a vehicle seat backrest is described, that includes:

a backrest armature, a backrest upholstery fixed to the backrest armature, the backrest upholstery having at least one slit, each slit being adapted to receive a headrest support rod by relative movement of the upholstery with respect to the backrest armature in a longitudinal direction of the vehicle seat, and at least a first and a second trim element, each trim element forming at least one notch, a notch of the first trim element and a notch of the second trim element defining a passage for a headrest support rod, the second trim element covering at least partially, preferably completely, the at least one slit in the upholstery, at least one of the first and second trim elements being in contact with the upholstery, in particular with a foam block of the upholstery.

Thus, the upholstery of such a backrest can easily and quickly be mounted onto the backrest armature and/or removed from the backrest. In particular, the upholstery can be mounted from a front face of the backrest, optionally while the headrest support rod/s is/are already mounted on the backrest armature. Likewise, it is possible to remove the upholstery towards the front of the backrest, without having to remove the headrest support rod/s, or preferably the headrest itself. However, the presence of the first and second trim elements provide an aesthetic finish of the seat backrest, which is particularly appreciated by users.

According to preferred embodiments, the vehicle seat backrest includes one or several of the following features, taken alone or in combination:

each trim element forms two notches, such that each notch of the first trim element is facing a respective notch of the second trim element so as to define a passage having a complementary cross section to the cross section of a respective headrest support rod;

the first trim element is fixed to at least one of the upholstery, in particular a foam block of the upholstery, or a support of a foam block of the upholstery, and the backrest armature, in particular by elastic interlocking, and/or the second trim element is fixed to at least one of the upholstery, in particular a foam block of the upholstery or a support of a foam block of the upholstery, the backrest armature and the first trim element, in particular by elastic interlocking;

the second trim element is fixed only to the first trim element;

the upholstery, in particular a foam block of the upholstery, has a groove accommodating a complementary relief of the first trim element, in particular a rib of the first trim element;

the upholstery, in particular a foam block of the upholstery, has a recess having a section complementary to a part of the first trim element, the recess being preferably arranged on an opposite side of the headrest support rods with respect to the groove if applicable;

the first trim element and/or the second trim element compresses the upholstery, in particular a foam block of the upholstery;

the first trim element comprises means for fixing it to the upholstery, in particular to a support of a foam block of the upholstery, in particular elastic interlocking reliefs;

the second trim member is shaped as a curved shell, the curvature of the shell being substantially equal to the curvature of a portion of the upholstery, in particular of a foam block of the upholstery, covered by the second trim element;

the second trim element comprises means for fixing it to the first trim element, in particular at least one elastic interlocking relief;

the first and second trim elements include complementary guiding means for guiding a relative movement of the second trim element with respect to the first trim element to a fixation position of the second trim element, the complementary guiding means preferably comprising at least one, more preferably at least two and even more preferably four pair/s of a projecting relief on one among the first trim element and the second trim element and of a female relief adapted to accommodate the projecting relief, on the other among the first trim element and the second trim element;

the upholstery comprises at least one central upholstery module, adapted to be fixed to the backrest armature;

the vehicle seat backrest further comprises two side upholstery modules each arranged on a respective side of the central upholstery module, each of the three upholstery modules being preferably adapted to be fixed to the backrest armature independently of the other two upholstery modules, each of the three upholstery modules being more preferably fixed to the backrest armature independently of the other two upholstery modules;

each upholstery module includes a upholstery independent with respect to the upholstery of the two other upholstery modules;

the central upholstery module includes at least one support, fixed to the backrest armature, and a foam block covering all or part of the support, the first and/or the second trim element(s) preferably being fixed to the support of the central upholstery module, if applicable, each side upholstery module includes a support to which a foam block is fixed;

the central upholstery module and/or at least one, preferably each of the side upholstery modules comprise/s a respective cover, each cover covering at least part of the respective foam block, if applicable;

the vehicle seat backrest further comprises a common cover covering all or part of the three upholstery modules, in particular the foam blocks of the three upholstery modules, if applicable.

In another aspect, a motor vehicle seat is also described, comprising a seating base with a seating base armature and a backrest as described above in all its combinations, the backrest armature being fixed to the seating base armature, preferably so as to be pivotable about a transverse axis.

According to yet another aspect, there is described a method of mounting a motor vehicle seat backrest as described above in all its combinations, comprising the steps consisting in:

providing a backrest armature;

providing upholstery adapted to be fixed onto the backrest armature over a front face of the backrest, the upholstery having at least one through slit, adapted to accommodate a headrest support rod;

fixing the upholstery onto the backrest armature;

fixing the at least two trim elements so as to form a passage for each headrest support rod, the second trim element covering at least partially the at least one slit.

According to yet another aspect, a method for manufacturing a vehicle seat is described, comprising the steps of:

providing a seating base with a seating base armature;

assembling a backrest by implementing a assembling method of a motor vehicle seat backrest as described above in all its combinations; and fixing the backrest to the seating base, preferably so that the backrest can pivot about a axis transverse with respect to the seating base.

A method for replacing upholstery of a vehicle seat backrest as described above is also described, in all its combinations, including the steps of:

i) removing the first and second trim elements;

ii) removing the upholstery from the backrest armature;

iii) fixing another upholstery onto the backrest armature; and iv) fixing first and second trim elements, the first and second trim elements being preferably the same in steps i) and iv).

A backrest (16) of a vehicle seat (10) includes an armature (17) and an upholstery (36, 38, 40) fixed to the armature (17). The upholstery (36, 38, 40) has a slit (96, 97) for accommodating a headrest support rod (35) by relative movement of the upholstery (36, 38, 40) with respect to the armature (17) in a longitudinal direction (X) of the vehicle seat (10). The backrest (16) further includes first and second trim elements (50; 52). Each trim element (50, 52) forms a notch (84, 95). The notches of the first and second trim elements (50, 52) define a passage (98) for a headrest support rod (35). The second trim element (52) partially covers the slit (96, 97) in the upholstery (36, 38, 40). The first and/or the second trim elements (50; 52) is/are in contact with the upholstery (36, 38, 40).

The invention claimed is:

1. A vehicle seat backrest comprising:
a backrest armature,
a backrest upholstery fixed to the backrest armature, the backrest upholstery having at least one slit, each slit being adapted to receive a headrest support rod by relative movement of the upholstery with respect to the backrest armature in a longitudinal direction of the vehicle seat, and
at least a first trim element and a second trim element, each trim element forming at least one notch, a notch of the first trim element and a notch of the second trim element defining a passage for a headrest support rod, the second trim element covering at least partially the at least one slit in the upholstery, at least one of the first and second trim elements being in contact with the upholstery,
wherein the first trim element is fixed to at least one of the upholstery and the backrest armature.

2. The vehicle seat backrest of claim 1, wherein each trim element forms two notches, such that each notch of the first trim element is facing a respective notch of the second trim element so as to define a passage having a complementary cross section to the cross section of a respective headrest support rod.

3. The vehicle seat backrest of claim 1, wherein the second trim element is fixed to at least one of the upholstery, the backrest armature and the first trim element.

4. The vehicle seat backrest of claim 3, wherein the second trim element is fixed only to the first trim element.

5. The vehicle seat backrest of claim 1, wherein the upholstery has a groove accommodating a complementary relief of the first trim element.

6. A vehicle seat backrest comprising:
a backrest armature,
a backrest upholstery fixed to the backrest armature, the backrest upholstery having at least one slit, each slit being adapted to receive a headrest support rod by relative movement of the upholstery with respect to the backrest armature in a longitudinal direction of the vehicle seat, and
at least a first trim element and a second trim element, each trim element forming at least one notch, a notch of the first trim element and a notch of the second trim element defining a passage for a headrest support rod, the second trim element covering at least partially the at least one slit in the upholstery, at least one of the first and second trim elements being in contact with the upholstery,
wherein the upholstery has a recess having a section complementary to a part of the first trim element.

7. The vehicle seat backrest of claim 1, wherein at least one among the first trim element and the second trim element compresses the upholstery.

8. The vehicle seat backrest of claim 1, wherein the first trim element comprises means for fixing it to the upholstery.

9. The vehicle seat backrest of claim 1, wherein the second trim element is shaped as a curved shell, the curvature of the shell being substantially equal to the curvature of a portion of the upholstery covered by the second trim element.

10. The vehicle seat backrest of claim 1, wherein the second trim element comprises means for fixing it to the first trim element.

11. The vehicle seat backrest of claim 1, wherein the first and second trim elements include complementary guiding means for guiding a relative movement of the second trim element with respect to the first trim element to a fixation position of the second trim element.

12. The vehicle seat backrest of claim 1, wherein the upholstery comprises at least one central upholstery module, adapted to be fixed to the backrest armature.

13. The vehicle seat backrest of claim 12, further comprising two side upholstery modules each arranged on a respective side of the central upholstery module.

14. The vehicle seat backrest of claim 13, wherein each upholstery module comprises an upholstery independent with respect to the upholstery of the two other upholstery modules.

15. The vehicle seat backrest of claim 12, wherein the central upholstery module comprises at least one support, fixed to the backrest armature, and a foam block covering at least a part of the support.

16. The vehicle seat backrest of claim 13, wherein each side upholstery module comprises a support on which a foam block is fixed.

17. The vehicle seat backrest of claim 13, wherein at least one among the central upholstery module and at least one of the side upholstery modules comprise/s a respective cover.

18. The vehicle seat backrest of claim 13, further comprising a common cover covering at least a part of the three upholstery modules.

19. A method for mounting the vehicle seat backrest according to claim 1, comprising the steps of:
- providing a backrest armature;
- providing upholstery adapted to be fixed onto the backrest armature over a front face of the backrest, the upholstery having at least one through slit, adapted to accommodate a headrest support rod;
- fixing the upholstery onto the backrest armature; and
- fixing at least two trim elements, including a first trim element and a second trim element, so as to form a passage for each headrest support rod, the second trim element covering at least partially the at least one slit, wherein the first trim element is fixed to at least one of the upholstery and the backrest armature.

* * * * *